United States Patent [19]

Kaller

[11] Patent Number: 4,712,801
[45] Date of Patent: Dec. 15, 1987

[54] SEALING GASKET ASSEMBLY

[76] Inventor: Sigurd Kaller, Blästadgatan 111, S-582 62 Linköping, Sweden

[21] Appl. No.: 916,512
[22] PCT Filed: Feb. 5, 1986
[86] PCT No.: PCT/SE86/00050
 § 371 Date: Sep. 15, 1986
 § 102(e) Date: Sep. 15, 1986
[87] PCT Pub. No.: WO86/04656
 PCT Pub. Date: Aug. 14, 1986

[30] Foreign Application Priority Data

Feb. 5, 1985 [SE] Sweden ............... 8500515

[51] Int. Cl.$^4$ ............... F16J 15/46; F16J 15/56
[52] U.S. Cl. .................. 277/71; 277/176; 277/190; 277/198; 277/201; 277/205
[58] Field of Search .......... 277/165, 173, 190, 205, 277/71, 73, 176, 188 R, 188 A, 198, 201, 138

[56] References Cited

U.S. PATENT DOCUMENTS

| 1,958,011 | 5/1934 | Moore | 277/198 |
| 3,268,235 | 8/1966 | Jacobellis | 277/165 |
| 3,323,806 | 6/1967 | Smith et al. | 277/190 X |
| 3,394,939 | 7/1968 | Mastro | 277/176 X |
| 3,606,356 | 9/1971 | Beroset | 277/165 |
| 3,718,338 | 2/1973 | Traub | 277/176 X |
| 3,942,806 | 3/1976 | Edlund | 277/165 |
| 4,116,452 | 9/1978 | Schanz | 277/205 |
| 4,252,331 | 2/1981 | Siegel | 277/165 X |
| 4,268,045 | 5/1981 | Traub | 277/205 X |

FOREIGN PATENT DOCUMENTS

| 1109113 | 1/1956 | France | 277/190 |
| 710374 | 6/1954 | United Kingdom | 277/188 R |

Primary Examiner—Allan N. Shoap
Attorney, Agent, or Firm—Jeffers, Hoffman & Niewyk

[57] ABSTRACT

A gasket assembly is located between two cylindrical components capable of being displaced telescopically into one another. The gasket assembly includes an annular flange held stationary with respect to one of the components and associated therewith first and second annular sealing rings spaced radially apart by an annular piston capable of relative axial movement between the sealing rings to compensate for pressure and for wear on the sealing ring adjacent the movable cylindrical component relative to said flange. The adjacent surfaces of the annular piston and the latter sealing ring are designed for the assembly to function in this manner. A venting hole in the annular flange and the sealing characteristics of the other sealing ring further aid in accomplishing the sealing function of the assembly.

7 Claims, 2 Drawing Figures

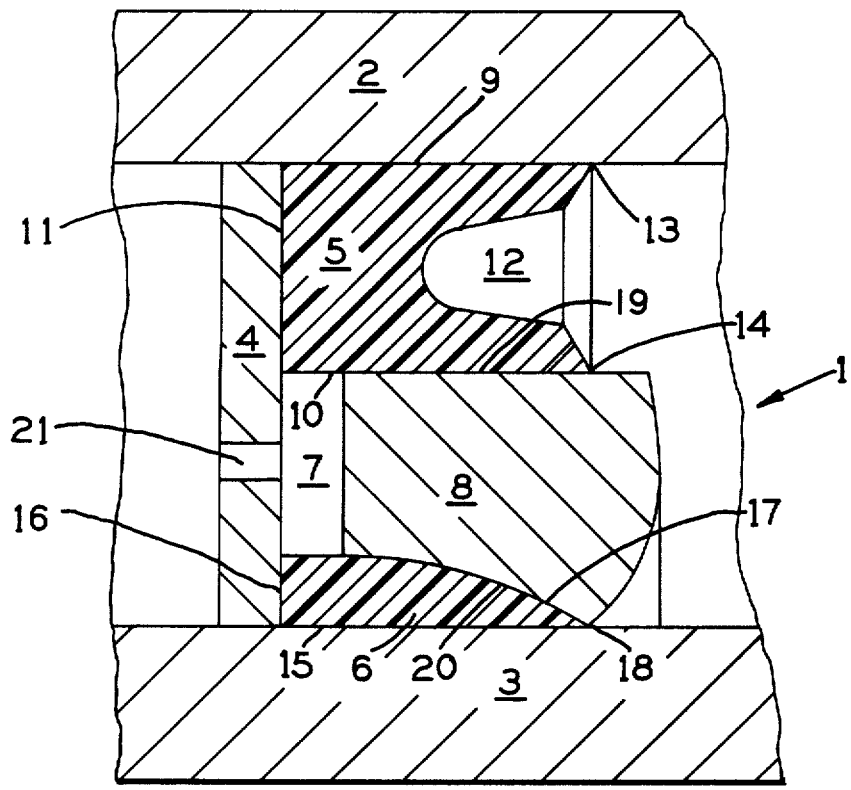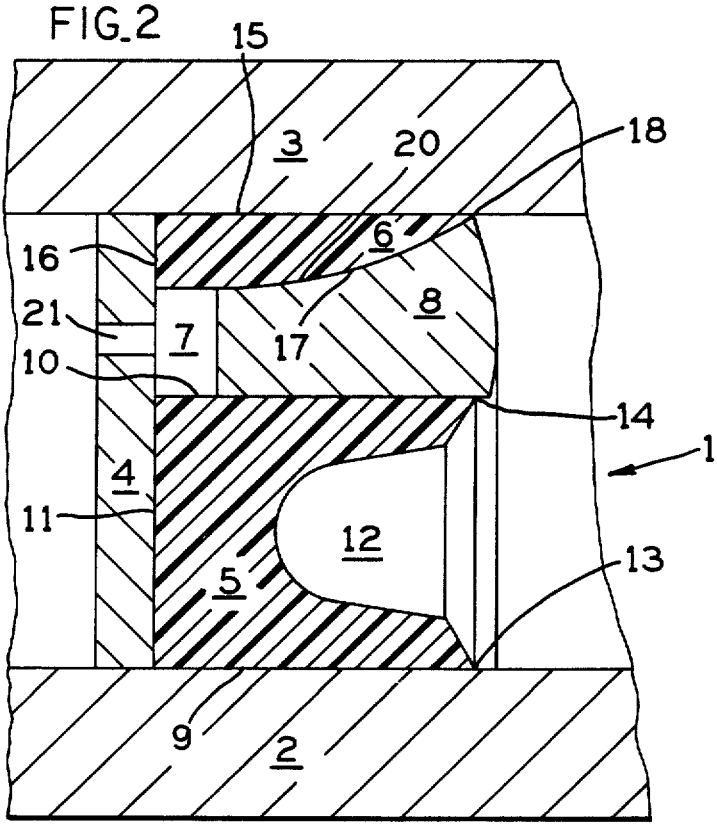

SEALING GASKET ASSEMBLY

BACKGROUND OF THE INVENTION

The present invention relates to a sealing gasket designed to act between two, a first and second, cylindrical components capable of being displaced telescopically into one another. The gasket is arranged to be kept stationary in relation to one of the components by an annular flange or similar support.

A gasket of this kind has an application in, for example, hydraulic or pneumatic cylinder/piston assemblies and in gas springs. These often operate in a dirty environment and are subject to stresses resulting from their intensive use, which leads to wear, consequent lack of sealing, and malfunctions. The gaskets are often designed to be adjustable for compensation of permitted wear. It is obvious that such adjustment leads to costs being incurred not only as a result of the adjustment operation itself, but also as a result of the stoppages and the associated lost production, which may be necessary in order to permit the adjustments to be made.

SUMMARY OF THE INVENTION

The object of the present invention is to provide a sealing gasket which is self-adjusting. The gasket comprises first and second concentric sealing rings arranged at a certain distance from one another and an annular piston arranged in the space between the rings. The sealing devices situated closest to the aforementioned first component have a generally rectangular or square cross-section with boundary surfaces which are cylindrical from the radial viewpoint or as viewed in cross-section along a longitudinal axis. The rectangular-shaped sealing devices have a 'U'- or 'V'-shaped radial annular groove, which groove is concave into the seal from the surface of the ring facing away from the annular flange. The second sealing ring has a cylindrical boundary surface making sealing contact with the second component, which moves relative to the sealing gasket. The second sealing ring has an annular surface which rests against the annular flange, and a boundary surface extending between the annular surface and the cylindrical boundary surface, which boundary surface approaches the cylindrical boundary surface approximately in the form of a parabola and terminates at a sharp point when viewed in a radial section. The annular piston has a generally wedge-shaped cross-section as its boundary surface, which makes contact with the first sealing ring, is of cylindrical form, while its opposite boundary surface in contact with the second sealing ring is a curved form fitting or conforming to the boundary surface of the second sealing ring.

BRIEF DESCRIPTION OF THE DRAWINGS

The invention is described below in more detail with reference to the accompanying radial section drawing, where FIG. 1 shows one design of the sealing gasket forming a seal against a moving piston rod, and FIG. 2 shows the gasket forming a seal against a moving cylinder.

DETAILED DESCRIPTION OF THE INVENTION

The designation 1 is used in the drawing to indicate a sealing gasket, and the designations 2 and 3 indicate two, a first and second, cylindrical components, which are capable of being displaced telescopically relative to one another. The sealing gasket 1 contacts and is kept stationary in relation to the first component 2 by an annular flange 4 attached to or integrated with the first component 2. The sealing gasket or gasket assembly comprises two concentric sealing rings 5, 6 of an elastic material arranged at a certain distance from one another to provide a space 7 between them. An annular piston 8 of a rigid material is positioned and operable inside space 7. Rigid material piston 8 is relatively harder than the elastic material sealing rings.

Sealing ring 5 contacts fixed first component 2, which is fixed relative to the sealing gasket, and exhibits a generally rectangular or square cross-section. Sealing ring 5 has, as viewed radially, cylindrical boundary surfaces 9, 10, and annular surface 11. Boundary surface 9 contacts the corresponding cylindrical surface of the component 2 and annular surface 11 contacts the annular flange 4. 'U'- or 'V'-shaped groove 12 in sealing ring 5 presses inwards or concavely from the side of the sealing ring 5 facing away from the annular flange 4. The edges of the groove 12 on sealing ring 5 are noted as sealing lips 13, 14.

Sealing ring 6 has a cylindrical boundary surface 15 contacting the cylindrical component 3, which component 3 moves relative to sealing gasket 1. Sealing ring 6 has a generally wedge-shaped cross-section and an annular surface 16 contacting annular flange 4. A boundary surface 17 of seal ring 6 faces toward seal ring 5 and extends between cylindrical boundary surface 15 and annular surface 16. Surface 17 approaches cylindrical boundary surface 15 from annular surface 16 in the form of a parabola and terminates at a sharp point 18, when viewed in a radial section. It may be pointed out that the aforementioned parabolic form is not entirely critical, but the surface 17 should curve toward surface 15 at more than a linear rate.

Annular piston 8 has a generally wedge-shaped cross-section with a blunt tip facing toward space 7. Annular piston 8 includes a cylindrical-like surface 19, which contacts cylindrical surface 10 of sealing ring 5, and an opposite boundary surface 20 with a form or shape to contact boundary surface 17 of sealing ring 6.

Sealing gasket 1 functions in the following manner: the pressure generated by gas or fluid, against which the sealing gasket is required to provide a seal, causes groove 12 to expand and form a good seal at lips 13, 14 against the fixed component 2 and against annular piston 8. Piston 8 is forced or moved by the aforementioned pressure into space 7, which is preferably vented via a channel 21 through the annular flange 4. Movement of annular piston 8 forces the sealing lip of sealing ring 6 at sharp point 18 against moving component 3 to provide a good seal. As component 3 moves sealing ring 6 is worn, and annular piston 8 automatically compensates for this wear by being forced or moved further into space 7 by the fluid pressure to maintain boundary surface 15 of seal ring 6 in contact with component 3. Thus the sealing gasket will automatically compensate for seal ring wear to provide a seal of consistent quality. As noted in the drawing cross-section, the cylindrical components are a hard material which hard moving component 3 wears elastic material seal ring 6, as noted above.

I claim:

1. A sealing assembly operable between a first cylindrical component and a second cylindrical component, which first and second components are telescopically displaceable relative to each other, said gasket comprising:

an annular flange being stationary relative to one of said first and second cylindrical components, which annular flange includes a vent passage therethrough;

a first sealing ring;

a second sealing ring separated from said first sealing ring at a fixed distance, which first and second sealing rings cooperate to define a space therebetween;

an annular piston mounted and operable in said space, which space is vented between said annular flange and said annular piston by said annular passage vent;

one of said first and second sealing rings positioned in proximity to said first cylindrical component, said one sealing ring having a generally rectangular configuration in cross-section and defining an annular surface contacting said annular flange and an opposite surface away from said annular flange, a first and a second radially-viewed cylindrical boundary surface, and, a groove which extends toward said annular flange from said opposite surface, first and second sealing lips being formed, respectively, between said groove and said first and second cylindrical boundary surface;

the other of said first and second sealing rings having a radially-viewed cylindrical boundary surface, said other ring cylindrical boundary surface sealingly contacting said second cylindrical component, which second cylindrical component moves relative to said sealing assembly, said other sealing ring further including an annular surface contacting said annular flange and a sloped surface extending between said annular surface contacting said annular flange and said cylindrical boundary surface and terminating in cross-section at a sharp point at said cylindrical boundary surface distal from said annular flange;

said annular piston having a generally wedge-shaped cross-section with a cylindrical boundary surface to contact at least a portion of the cylindrical boundary surface of the sealing ring in proximity to said first component adjacent a sealing lip and having a curved form boundary surface conforming to said sloped form of the sealing ring in proximity to said second component, said annular piston of a material relatively harder than said sealing rings and movable in said space toward said annular flange to maintain said first and second sealing rings in sealing contact with said first and second components.

2. A sealing gasket as claimed in claim 1 wherein said first and second sealing rings are an elastic material and said annular piston is a rigid material.

3. A sealing gasket as claimed in claim 1 wherein said second component is reciprocal along said other seaing ring cylindrical boundary surface.

4. A sealing gasket as claimed in claim 1 wherein said annular piston and sealing rings are at an initial position, said piston thereafter further extends into said space toward said annular flange as said sealing rings are worn, thus maintaining said sealing rings in sealing contact with said first and second components.

5. A sealing gasket as claimed in claim 1 wherein said other of said first and second sealing rings sloped surface is sloped at greater than a linear rate from said other ring annular surface to said other ring cylindrical boundary surface.

6. A sealing gasket as claimed in claim 1 wherein said other of said first and second sealing rings sloped surface is sloped from said other ring annular surface to said other ring cylindrical surface with a generally parabolic surface.

7. A sealing gasket as claimed in claim 1 wherein said one of said first and second sealing rings further define edges of said groove, which edges are operable as sealing lips with said annular piston and said fixed cylindrical component.

* * * * *

UNITED STATES PATENT AND TRADEMARK OFFICE
CERTIFICATE OF CORRECTION

PATENT NO. : 4,712,801

DATED : December 15, 1987

INVENTOR(S) : Sigurd Kaller

It is certified that error appears in the above-identified patent and that said Letters Patent is hereby corrected as shown below:

Claim 3, Col. 4, line 18, change "seaing" to --sealing--.

Signed and Sealed this

Seventh Day of June, 1988

Attest:

*Attesting Officer*

DONALD J. QUIGG

*Commissioner of Patents and Trademarks*